United States Patent [19]

Yazima et al.

[11] Patent Number: 5,107,421
[45] Date of Patent: Apr. 21, 1992

[54] COMPUTER SYSTEM IN WHICH WORK STATIONS SUPPORT THE BASIC ELECTRONIC DATA PROCESS

[75] Inventors: Kazunori Yazima, Komae; Sadamichi Mitsumori, Hachioji, both of Japan

[73] Assignee: Hitachi, Ltd., Tokyo, Japan

[21] Appl. No.: 196,536

[22] Filed: May 20, 1988

[30] Foreign Application Priority Data

May 22, 1987 [JP] Japan .................... 62-123775

[51] Int. Cl.$^5$ ............................. G06F 13/00
[52] U.S. Cl. ................................. 364/405
[58] Field of Search ............... 235/379, 380; 364/405, 364/900, 200; 902/22, 40

[56] References Cited

U.S. PATENT DOCUMENTS

| | | | |
|---|---|---|---|
| 4,107,784 | 8/1978 | Van Bemmelen | 364/900 |
| 4,468,750 | 8/1984 | Chamoff et al. | 364/900 |
| 4,635,189 | 1/1987 | Kendall | 364/200 |
| 4,648,061 | 3/1987 | Foster | 364/900 |
| 4,665,501 | 5/1987 | Saldin et al. | 364/900 |
| 4,709,328 | 11/1987 | Anthony, Jr. et al. | 364/200 |
| 4,752,870 | 6/1988 | Matsumura | 364/200 |

OTHER PUBLICATIONS

Everest, G. C. "Database management: Objectives, system functions, and administration", McGraw-Hill Book Company, 1986, 750–760.

McFadden, F. R. et al. "Data base management", The Benjamin/Cummings Publishing Company: Menlo Park, CA, 1985, 514–5.

Primary Examiner—Dale M. Shaw
Assistant Examiner—Andren F. Bodendorf
Attorney, Agent, or Firm—Pennie & Edmonds

[57] ABSTRACT

A computer system executing business processings is disclosed, in which work stations, which themselves have processing functions, are combined with a host computer. In the host computer is disposed a basic electronic data processing system executing typical standardized processings. Each of the work stations executes business processings added to those executed by the basic electronic data processing system according to processing conditions set by a user of the work station.

5 Claims, 12 Drawing Sheets

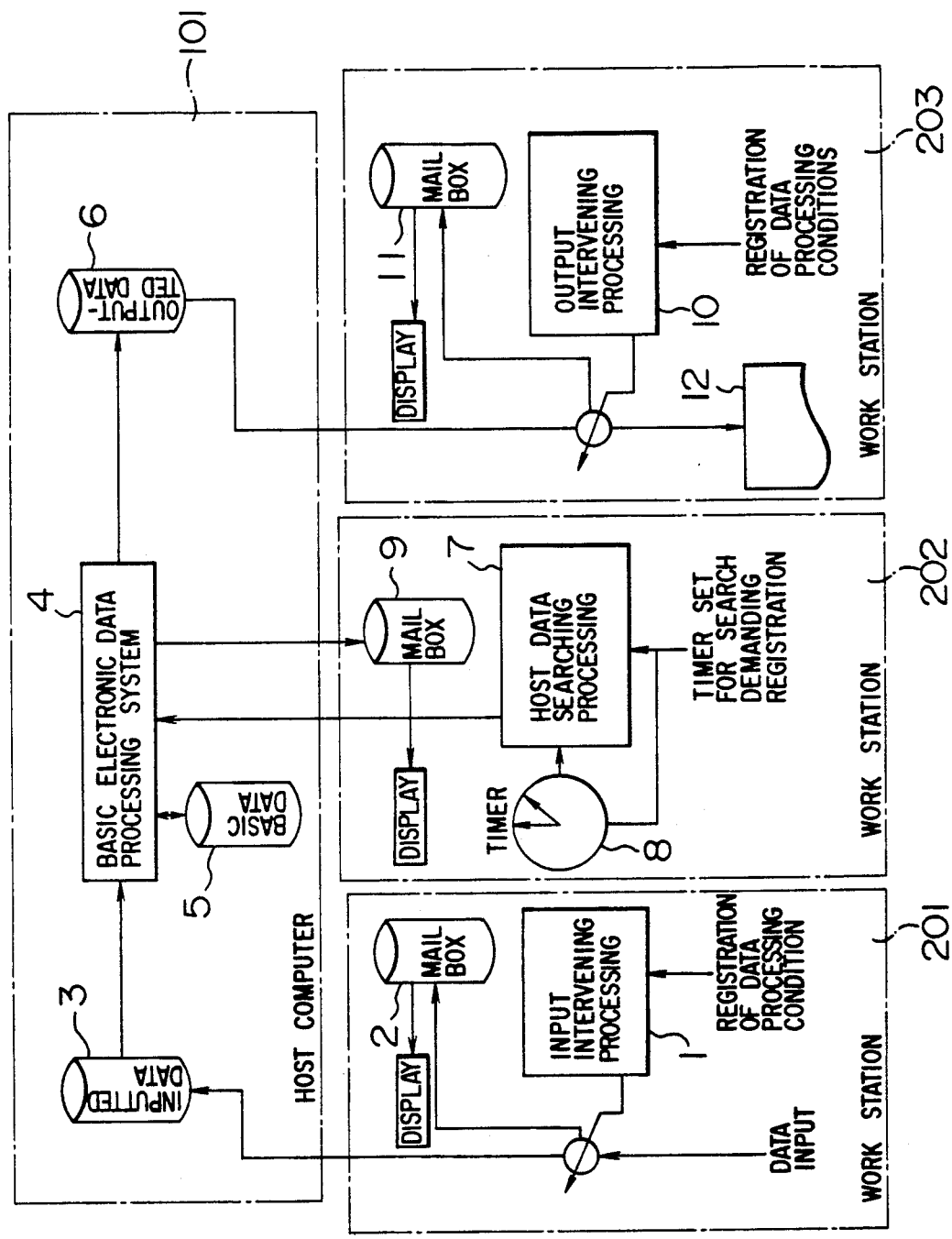

FIG. 2

```
IMAGE FOR REGISTERING PROCESSING CONDITIONS

CLIENT CODE   00110

ITEM          PRODUCT NAME        ITEM          UNIT PRICE
PROCESSING    TELEVISION,         PROCESSING    ≥ NET PRICE × 0.6
CONDITION     EXIST               CONDITION
PROCESSING    MAIL BOX            PROCESSING    MAIL BOX
              OUTPUT                            OUTPUT
```

FIG. 5

```
IMAGE FOR REGISTERING SEARCH DEMAND

SEARCHING FILE         STOCK FILE
SEARCHING              NAME OF MERCHANDISE = SUIT AND
CONDITION              STOCKED QUANTITY > 600
REPORTED               NAME OF MERCHANDISE, STOCKED
INFORMATION            QUALITY, DATE
SEARCH TIME            FEBRUARY 26, P.M. 1 O'CLOCK, WITH
                       INTERVAL OF 1 HOUR
TERMINATION            FEBRUARY 27, P.M. 1 O'CLOCK, OR
CONDITION              CONDITIONS ARE SATISFIED
```

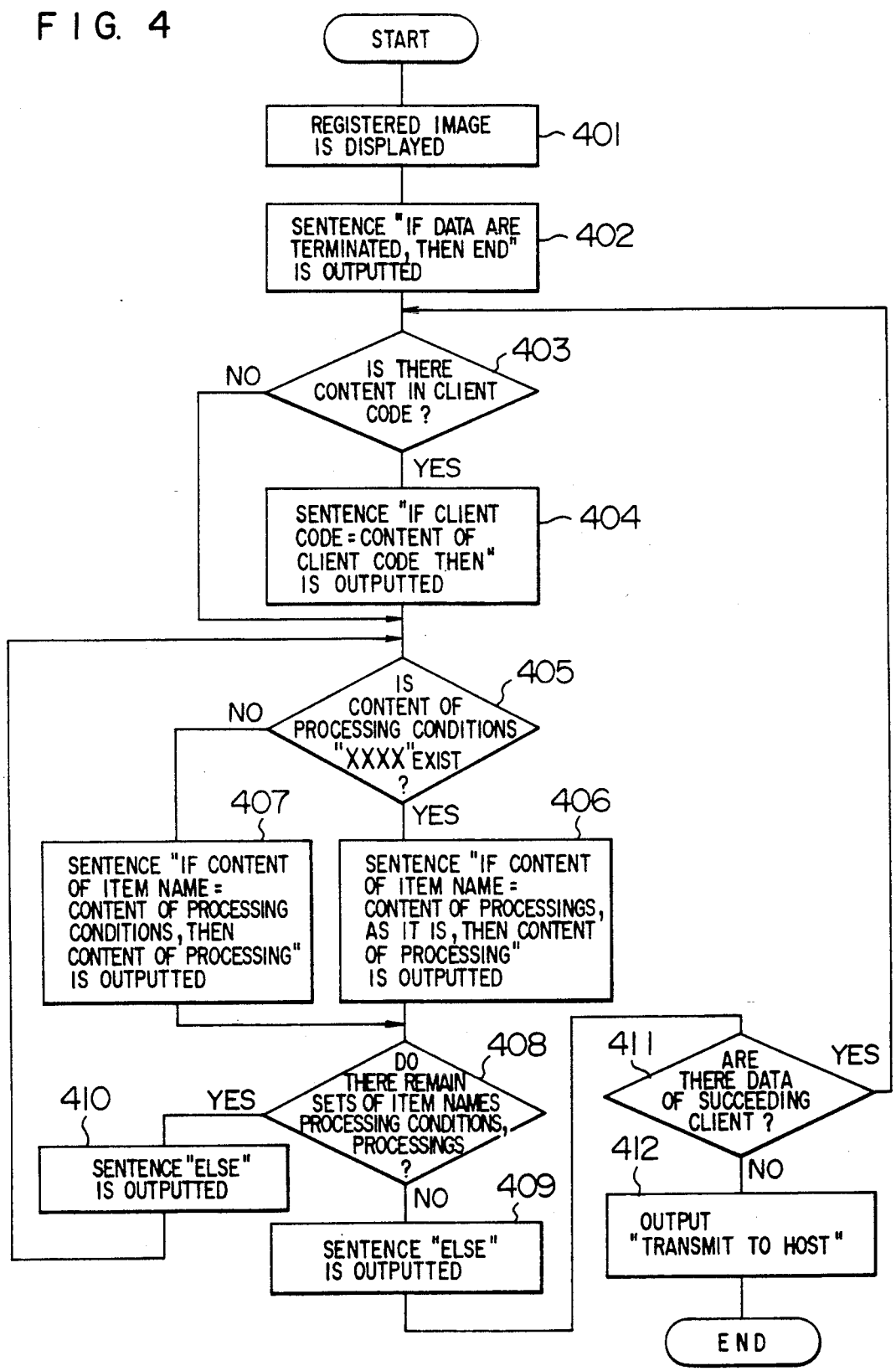

FIG. 9

| | |
|---|---|
| \multicolumn{2}{c}{IMAGE FOR REGISTERING PROCESSING CONDITIONS} |
| CLIENT CODE | 00110 |
| ITEM | AMOUNT CLAIMED |
| PROCESSING CONDITIONS | \|AMOUNT CLAIMED FOR THIS MONTH − AMOUNT CLAIMED FOR LAST MONTH\| > 2 MILLION YENS |
| PROCESSING | OUTPUT TO MAIL BOX |

FIG. 12

| | |
|---|---|
| RESERVATION FILE | STOCK FILE |
| RESERVATION CONDITIONS | NAME OF MERCHANDISE = TROUSERS AND STOCKED AMOUNT > 700, RESERVED AMOUNT = 100 |
| REPORTED INFORMATION | NAME OF MERCHANDISE RESERVED AMOUNT, DATE |
| RESERVATION TIME | APRIL 5, 12 O'CLOCK AT INTERVAL OF ONE AND HALF HOURS |
| TERMINATION CONDITIONS | APRIL 7, 12 O'CLOCK OR CONDITIONS ARE SATISFIED |

COMPUTER SYSTEM IN WHICH WORK STATIONS SUPPORT THE BASIC ELECTRONIC DATA PROCESS

BACKGROUND OF THE INVENTION

1. Field of the Invention

This invention relates to a computer system, in which the host computer processes data in liaison with work stations, and in particular to a system carrying out various not standardized processes.

2. Description of the Related Art

In the case where a sale management system is provided on a host computer and utilized by a number of users e.g. in a computer system for sale management, each of the users has a demand to execute also own non-standardized processings. However, if it were tried to form a sale management system capable of executing all these non-standardized processings on a host computer, the system would be complicated. Furthermore it would give rise to problems that confirmation of the system specification between system designers and users requires much time, that the completed system may be different from those desired by users, etc.

Or, in order to avoid these problems, sometimes computer systems may be so designed that they support no non-standardized operations.

In this way it was very difficult for a large scale basic electronic data processing system to be able to process many non-standardized operations.

An article "Micro-main frame link advancing to a full scale spread (in Japanese)" published in Nikkei Computer (Nikkei McGraw-Hill Publishing Co. JAPAN), Feb. 16, 1987, pp. 71–84 discloses a computer system, in which a host computer is combined with personal computers. Here are described a system, in which main processing programs are stored in the personal computers and the basic data base and programs supporting the execution of processing programs stored in the personal computer are disposed in the host computer, so that processing programs using basic data base stored in the host computer are executed by personal computers, as well as a dispersed processing system, in which data processing is partly shared and executed by the host computer and the personal computers. However there are no articles dealing with the problems described above.

In Japanese patent laid-open JP-A-61-290564 (corresponding to copending U.S. Patent application Ser. No. 06/745,546, filed June 17, 1985, now U.S. Pat. No. 4,709,328,) filed on June 17, 1985) is disclosed a computer system, in which a host system and an auxiliary system are mutually connected. This computer system is so constructed that the host system and the auxiliary system can execute independently and simultaneously business programs different from each other. Consequently this prior art has nothing to do with this application relating to the problems described above.

SUMMARY OF THE INVENTION

The object of this invention is to provide a basic electronic data processing system constructed on a host computer, which can have easily a non-standardized electronic data processing function.

According to this invention, in a computer system having a host computer and work stations connected therewith are disposed a basic electronic data processing system working on the host computer and a supporting system working on the work stations and supporting the basic electronic data processing. The supporting system can execute non-standardized operations added to the basic electronic data processing system, which operations are different from work station to work station. Further the electronic data processing executed by the basic electronic data processing is set by the work stations.

In this way it is possible for the users to execute carefully thought out processings matched with the demand of the users without modifying the basic electronic data processing system.

BRIEF DESCRIPTION OF THE DRAWINGS

FIG. 1 is a conceptional scheme of an embodiment of this invention;

FIG. 2 shows an example of the image for registering inputted processing conditions;

FIG. 4 is a flow chart of a processing for receiving the inputted processing conditions shown in FIG. 2 and generating the program shown in FIG. 3;

FIG. 5 shows an example of the image for registering searching conditions;

FIG. 9 shows an example of the image for registering output processing conditions;

FIG. 12 shows an example of the image for registering reservation processing conditions.

DESCRIPTION OF THE PREFERRED EMBODIMENTS

Figure 3:
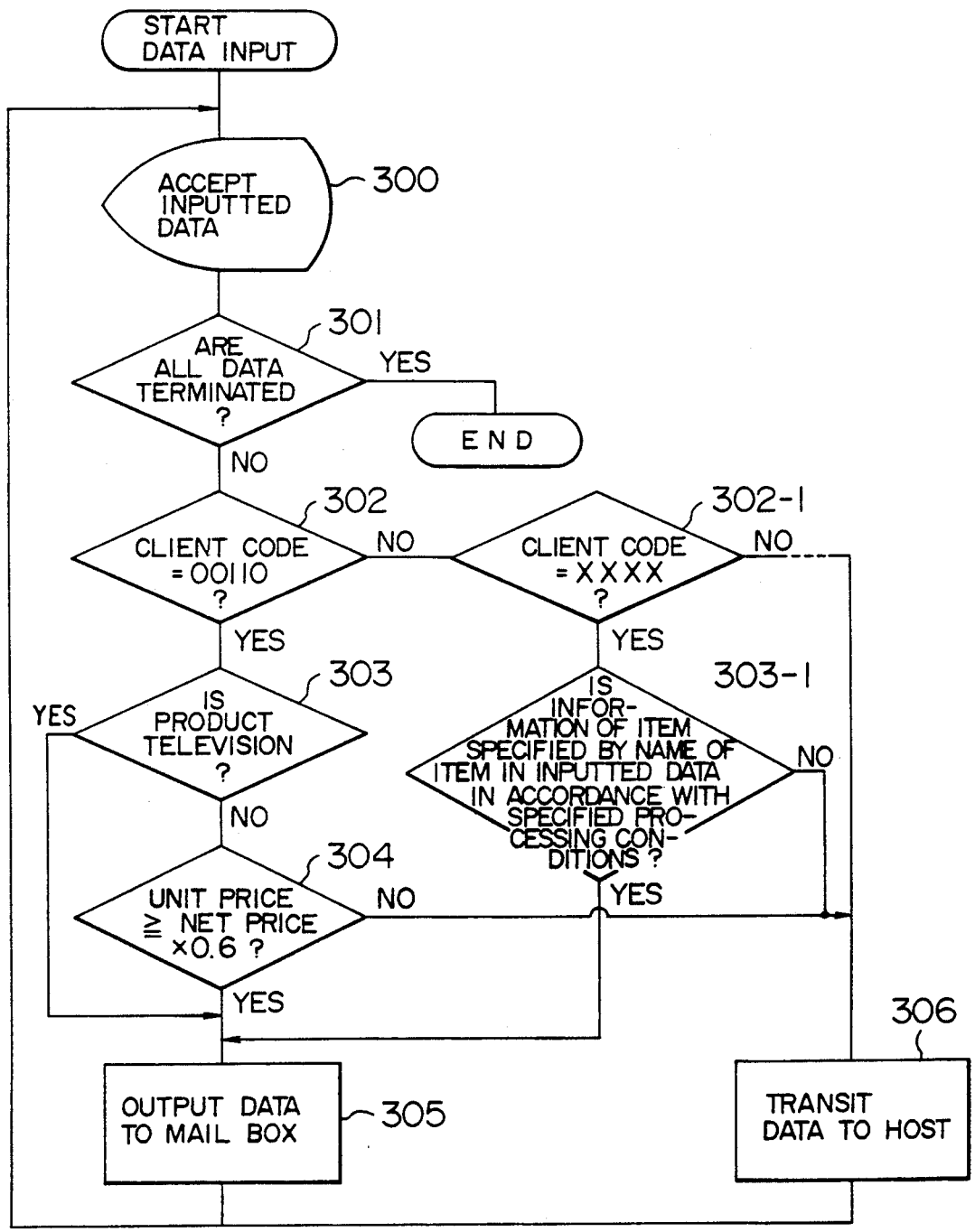
FIG. 3 is a flow chart of an input intervening processing program.

FIG. 1 is a conceptional scheme of the computer system, which is an embodiment of this invention. A host computer 101 executes the basic electronic data processing similar to that of the prior art. In the figure reference numeral 3 is a file storing data, which are inputted in the basic electronic data processing system; 4 is the basic electronic data processing system; 5 is basic data, which the basic electronic data processing system refers to and updates, usually called a master. Reference numeral 6 represents outputted data, which are outputted by the basic electronic data processing system.

The basic electronic data processing system 4 includes a central processing unit (CPU) and further a data base manager (executing the search and the updating), which is realized therein, as well as a business processing system realized by a business program. For example, when it is a sale management system, the input data file 3 stores sale data and the output data file 6 stores account data. On the other hand the basic data file 5 stores stock data of merchandises relating to the sale. The business processing system consists of an account issuing system, a stock management system and a reservation system. What is described above is completely identical to a prior art sale management system. Reference numerals 201, 202 and 203 represent three work stations linked with the host computer 101. Although explanation is made in the figure, supposing that each of the work stations has only one function, for the sake of simplicity, one work station can be provided with all the functions. Each of the work stations is provided with a data input device, a printer, a display device, a mail box and a program processing device. The program processing device stores programs for the input intervening processing, the host data searching processing and the output intervening processing and executes them. The processing conditions for these programs are registered in the respective work stations.

At first the input intervening processing will be explained.

When a user of one of the work stations specifies by means of the input device to register the input intervening conditions, the image for registering processing conditions indicated in FIG. 2, which is previously registered, is displayed on the display device. When data are inputted in the underlined portions, the program indicated in FIG. 3 is generated. This automatic program generation can be realized by using e.g. "Sharp APL", which offers the TSS service around North America. "Sharp APL" is treated in detail in "Sharp APL Reference Manual" (Publication Code 79RM05, 1979, published by I. P. Sharp Associates Limited Paul Berry). generating the program indicated in FIG. 3 by the known automatic program generating method. When the processing condition registration is instructed by a user of one of the work stations, the processing is started. At first the image for the registration stored previously, indicated in FIG. 2, is displayed in the display device (401). The user inputs necessary data. At first "if data are terminated, then END" is generated (402) (corresponding to Step 301 in FIG. 3). It is examined whether the client code is specified in the column of the client code or not (403), and when it is specified, "if client code=(specified client code, ex. 00110), then" is generated (404). This corresponds to Step 302 in FIG. 3. It is examined whether the data in the column for the processing conditions are written in the form of "(name of product), exist" or not (405), and if they are, "if (data in the column for the name of items: name of product) =(name of product in the column for the processing conditions), then (data in the column of the processing)" is generated (406). This corresponds to Steps 303, 305 in FIG. 3. When the form of the data in the column for the processing conditions is different, "if (data in the column for the name of items) =(data in the column for the processing conditions), then (data in the column for the processing)" is generated (407) (corresponding to Step 304 in FIG. 3). It is examined whether there still remain items, processing conditions, processings or not (408), and if they are, "ELSE" is generated (410) and the process returns to Step 405. The processing step succeedingly generated is located between Steps 304 and 305 in FIG. 3. If the result of Step 408 is "NO", "ELSE" is generated (409) and the process proceeds to Step 411. At Step 411 it is examined whether there are data for the following client or not and if there are, the process returns to Step 403. Processing steps generated thereafter are positioned at Steps 302-1 and 303-1 in FIG. 3. When the processing is terminated for all the registered data, "transmit data to the host" (corresponding to Step in FIG. 3) is generated. By the process described above the processing program indicated in FIG. 3 is generated.

Now the processing by this program at the data input will be explained. It is supposed that the basic system is a sale management system, as described previously. The user of the work station inputs sale data from the work station to the sale management system on the basis of sale slips. When the data input start is instructed from the input device, the processing of the program indicated in FIG. 3 is started. When the data inputted by the user are received (300), if the data are not terminated (301, NO), it is examined whether the client code in the inputted data is the client code "00110" specified previously or not (302). When they are in accordance with each other, it is examined whether there are TV sets in the product name data inputted in the mail box are outputted (305). If there are not (303, NO), it is examined whether the unit price≧the net price×0.6 or not (304). If it is, the data inputted in the mail box are outputted (305). If the result of both Steps 303 and 304 is NO, the inputted data are transmitted to the host basic system, as they are (306).

When the client code inputted at Step 302 is not in accordance with the specified code (302, NO), the process proceeds to Step 302-1 and similar processings are executed succeedingly. Such an execution of the processing acts as follows. That is, the inputted data, which are in accordance with the conditions previously registered, are not transmitted in the host basic system, but they are outputted to the mail box. Thus only the inputted data, which are not in accordance with the registered conditions, are transmitted to the host computer. This means that the data inputted in the basic system (sale management system) have been checked. This check is effected without any modifications in the basic system and under check conditions, which are proper to the work station. For example, if a work station is installed for every business office, it is possible to realize a carefully thought out check of the inputted data, which is matched with client and sale conditions, which are proper to every business office. Since the check conditions can be inputted from the work station, it is possible to set conditions, which are proper thereto. As the whole system it is possible to realize a sale management system provided with means for checking various input data and further there are no difficulties, which existed, when such a check was built in the basic system.

Although input data matched with the checking conditions were outputted to the mail box in the above embodiment, either they may be printed out or an alarm may be displayed on the screen of the display device.

Further, although the mail box is installed in the work station in this embodiment, the same process can be executed also by installing the mail box in the host.

By installing the mail box in the host, even in the case where, during the investigation of the reasons why abnormal data are inputted, another user of the work station continues to use it also after the investigation of the reasons, who has inputted the abnormal data can correct the data stored in the mail box, by using another work station. That is, since the mail box is provided to the host, the data stored in the mail box can be accessed from any of the work stations so that the abnormal data can be corrected by not only the work station from which the abnormal data are inputted, but also any other work station.

Furthermore, although in the above embodiment, when the processing conditions are inputted, the processing program is generated correspondingly, the system may be so constructed that a processing program is previously prepared; inputted processing conditions are stored in a table; this processing program reads out successively the columns of this table; and read out data are compared with inputted data. In this case a processing to read out the table is necessary and thus the processing time becomes more or less longer, but the processing to generate the program becomes unnecessary.

Next the search intervening processing will be explained.

Figure 6:
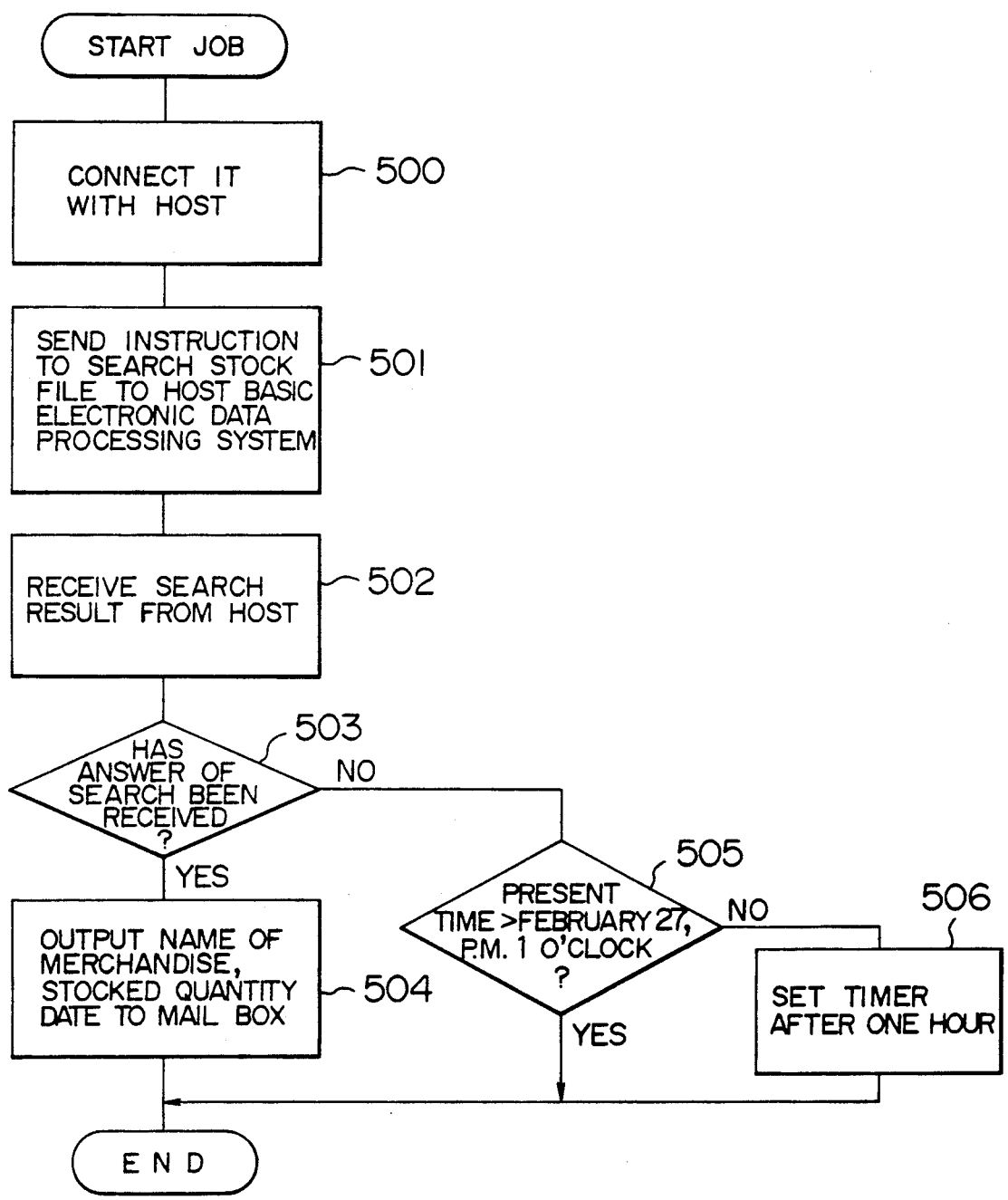
FIG. 6 is a flow chart of a searching processing program.
Figure 7A:
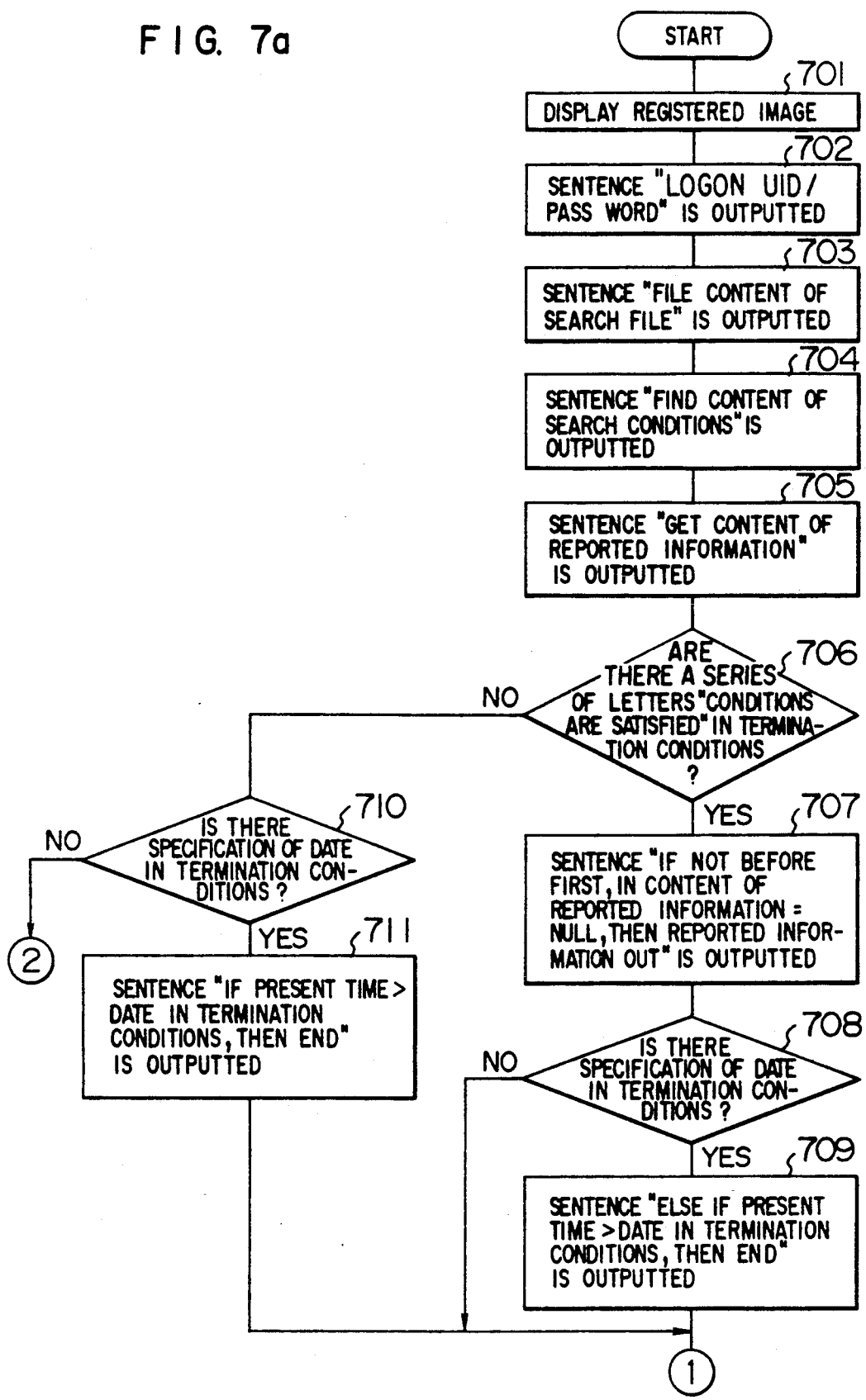
FIGS. 7a and 7b are flow charts of a processing for generating the program shown in FIG. 6.
Figure 7B:
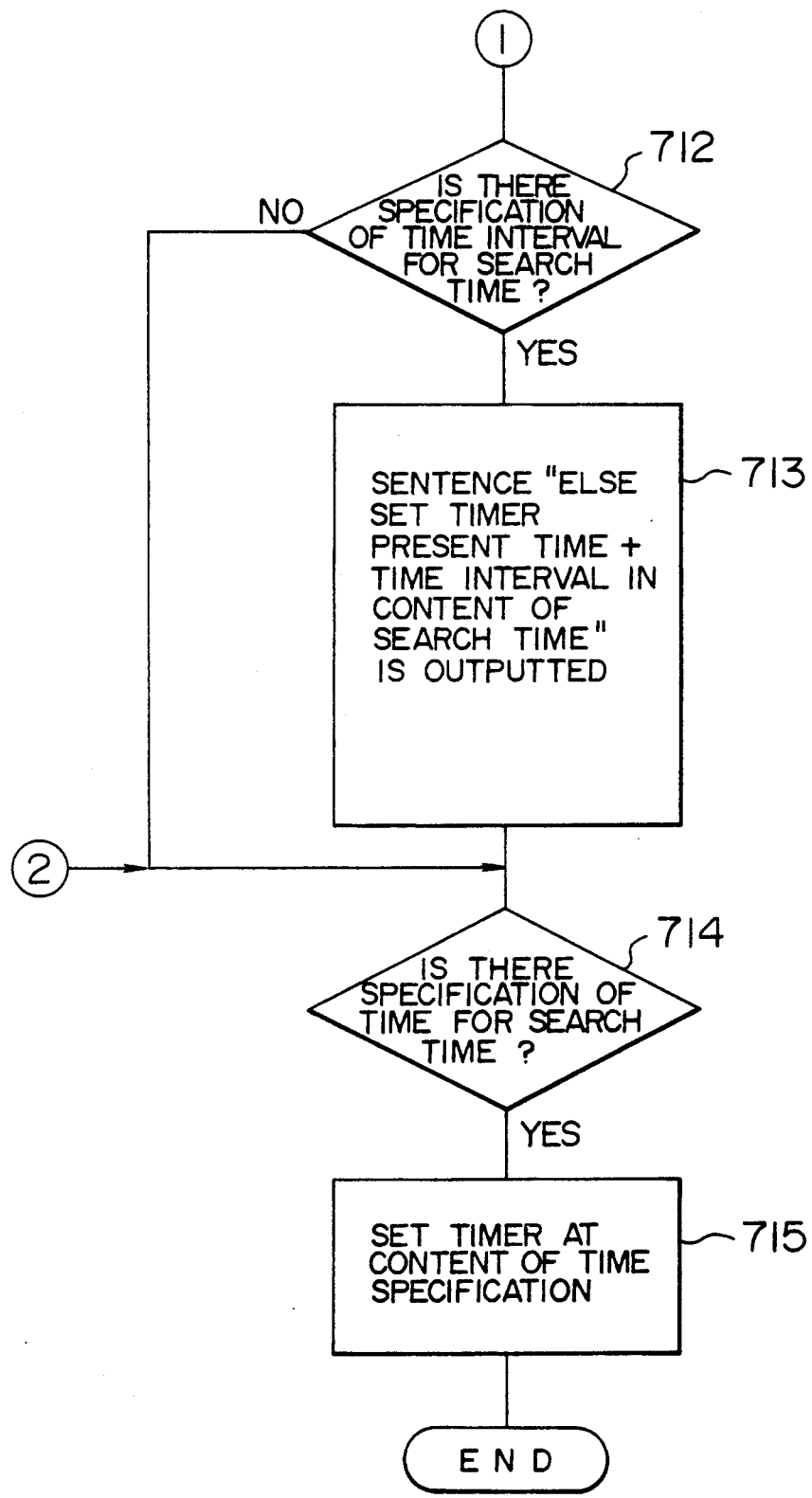

FIG. 5 shows an image for registering searching conditions. It indicates an example of the searching conditions, taking the case where the basic system is a sale management system, as an example. FIG. 6 indicates a search intervening program generated on the basis of these searching conditions. This is generated by a well-known method just as the program indicated in FIG. 3 and examples there of are shown in FIGS. 7a and 7b.

When a registration of the searching conditions is instructed by the input device, the image previously stored and indicated in FIG. 5 is displayed (701). When the input of the searching conditions is terminated, at first "LOGON UID/pass word" (corresponding to Step 500 in FIG. 6) is generated (702). Next "FILE (name of file specified in the column of the search file: stock file)" is generated (703), and also "FIND (searching conditions specified in the column of the searching conditions: name of merchandise =suit and stocked quantity>600)" is generated (704) (corresponding to Step 501 in FIG. 6). "GET (item in the column of the reported information: name of merchandise, stocked quantity, date)" (Step 502 in FIG. 6) is generated (705). It is judged whether there is a specification "the conditions are satisfied" in the column of the termination conditions, and if they are (706, YES), "IF (the first item in the column of the reported information)-≠NULL, then output (item in the column of the reported information: name of merchandise, stocked quantity, date)" (corresponding to Steps 503 and 504 in FIG. 6) is generated (707). Next it is judged whether the date is specified in the column of the termination conditions (708), if it is specified (708, YES) and "ELSE IF the present time >(the date specified in the column of the termination conditions), then END" (corresponding to Steps 505 in FIG. 6) is generated. Further, it is examined whether the time interval is specified in the column of the search time (712). If it is specified (712, YES), "ELSE SET TIMER the present time +(the time interval in the column of the search time: 1 hour)" (Step 506 in FIG. 6) is generated (713).

Figures 8A, 8B:
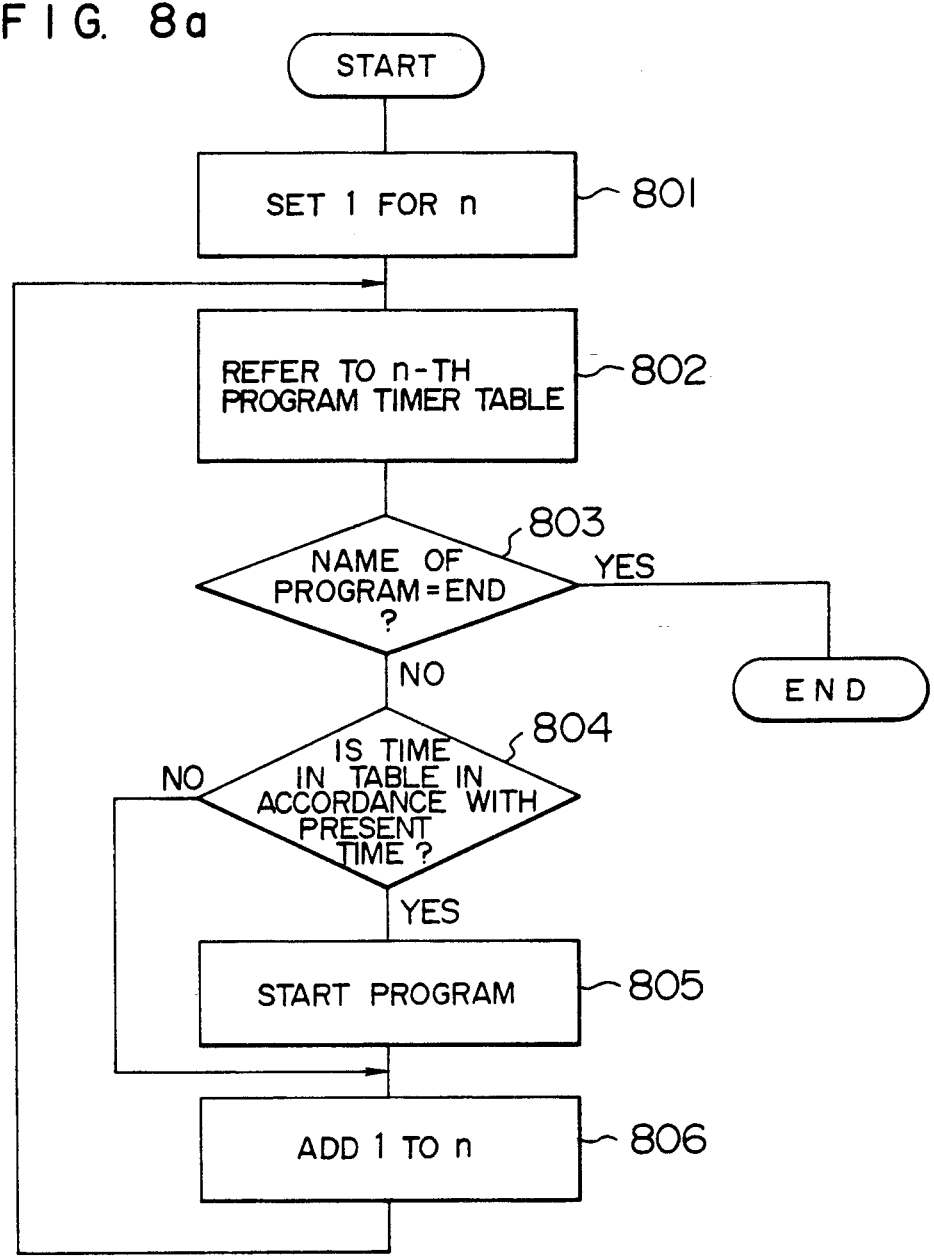
FIG. 8a a is a flow chart of a processing for starting the program shown in FIG. 6.
FIG. 8b shows an example of a program starting control program.

Next it is judged whether the time is specified in the column of the search time (714) and if it is specified, the timer is set at the date specified in the column of the search time. In the case where the judgment at Step 706 is NO, it is judged whether the date is specified in the column of the termination conditions or not and if it is specified, "IF the present time>(the date in the column of the termination time), then END" (corresponding to Step 505 in FIG. 6) is generated (711). In this way the program indicated in FIG. 6 is generated. Every time one search condition is registered, a program is generated. The generated program is registered in a table, as indicated in FIG. 8b. That is, the name of program (JOB1, JOB2, ---) and the starting time therefor are registered. FIG. 8a indicates a processing program for starting the program. This is a program for examining successively the columns of the table and for starting the search program, for which the time, which is in accordance with the present time, is registered. At first n=1 is set (801) and the registered time of the first search program is examined (802). If END is in the name of program, it is judged that it is the last of the table and the processing is terminated (803).

The read out time is compared with the present time (804), and if they are in accordance with each other, the search program is started (805). If they are not, 1 is added to n (806), and the process returns to Step 802.

Now the search program indicated in FIG. 6 is started, a processing for connecting the work station with the host computer is executed (500). Then, a command is sent to the basic electronic data processing system of the host instructing to scan the stock file under the conditions that the name of merchandise is "suit" and that the stocked quantity>600 and if the conditions are satisfied, to report the name of merchandise, the stocked quantity and the date of the search (501). This command can be expressed by a general data base access command. The data base manager disposed in the host computer receives this command and executes an access to the basic data base. The data base manager may be conventional one sold in the market, as stated previously. The data base manager receives the result of the search from the host (502), and if a result of the search in accordance with the search conditions is obtained (503, YES), it outputs the name of merchandise, the stocked quantity and the date, which it has received, to the mail box (504). If the result of the search is not obtained (503, NO), it is judged whether the search time has expired (505). If it has not expired, one hour is added to the timer (506) and the process is terminated. If it has expired (505, YES), the process is terminated as it is.

In this way it is possible to add a function to search automatically data under search conditions, which are proper to a user, from a work station (function to watch the basic data base) to the basic system. The system may be also so constructed that a search program is prepared previously just as the input intervening processing, and information concerning a registered search is stored in a table, the data of which are successively read out at every processing step to search data. This is a known programing technique just as the method for generating a program.

Next the output intervening processing will be explained.

Figure 10:
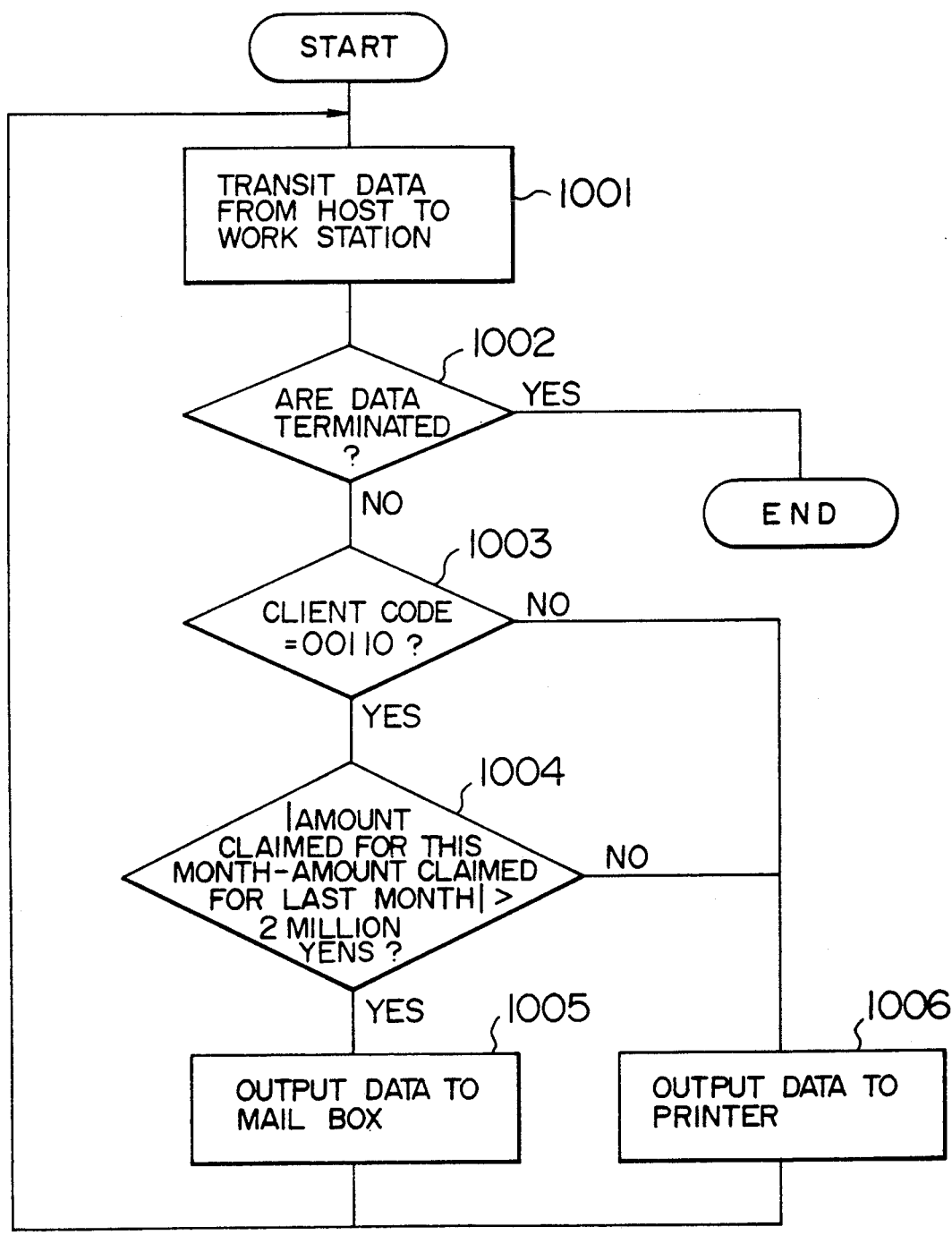
FIG. 10 is a flow chart of an output intervening processing program.
Figure 11:
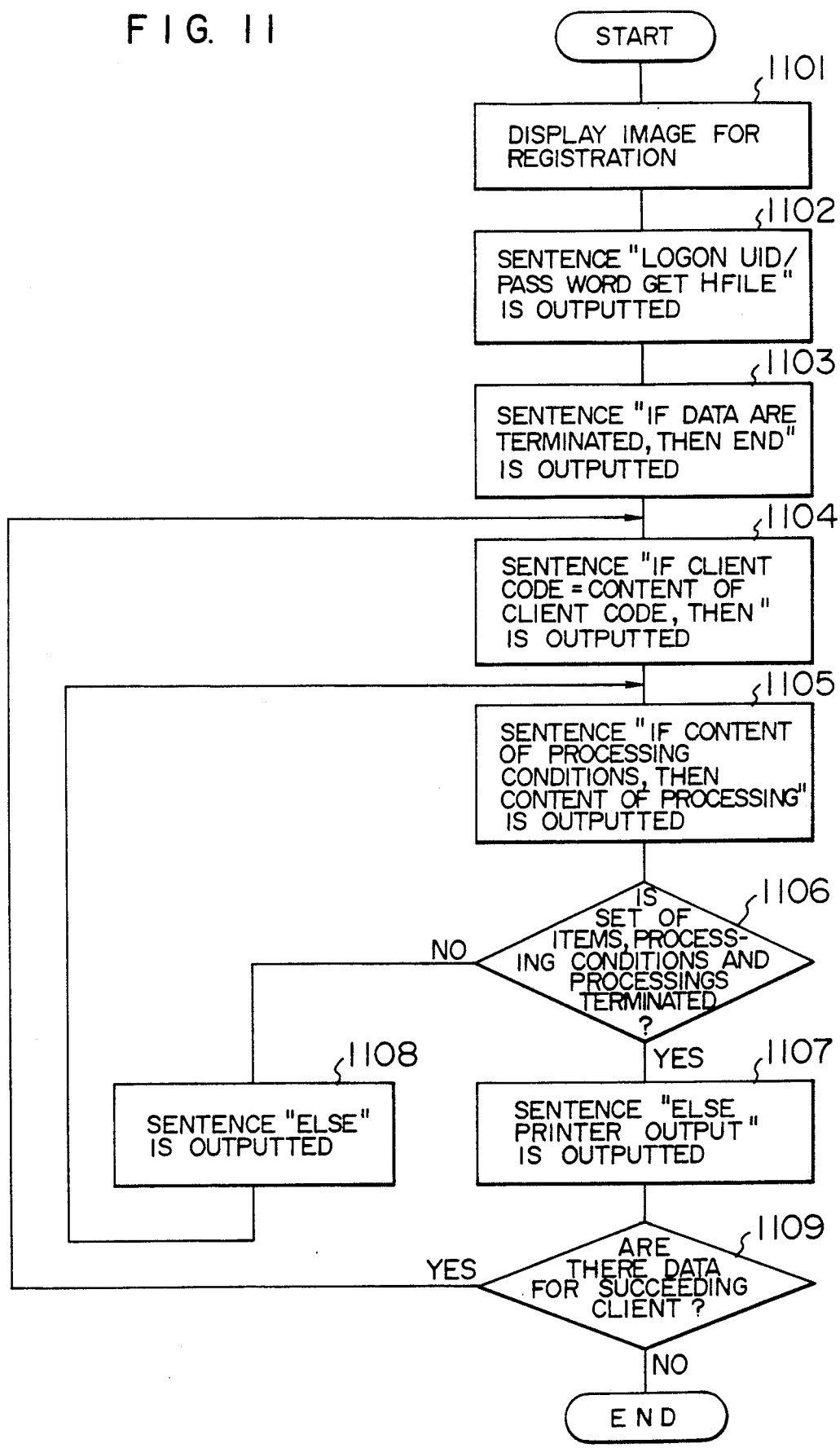
FIG. 11 is a flow chart of a processing for generating the program shown in FIG. 10.

FIG. 9 shows an example of the image for registering the output intervening processing. A program indicated in FIG. 10 is generated from the information registered by a processing procedure indicated in FIG. 11. At first the image indicated in FIG. 9 is displayed (1101). The user keys-in data according thereto.

"LOGON UID/pass word, GET HFILE" (corresponding to 1001 in FIG. 10) is generated (1102). Then "IF data is terminated, then END" (corresponding to Step 1002 in FIG. 10) is generated (1103). "IF the client code=(the code registered in the column of the client code: 00110) then" (corresponding to Step 1003 in FIG. 10) is generated (1104) and "IF (the data registered in the column of the processing conditions: |amount claimed of this month - amount claimed for the last month|>2 millions yens), then (the data registered in the column of the processing: output to the mail box)" (corresponding to Steps 1004 and 1005 in FIG. 10) is generated (1105). Next, it is checked as to whether the processing of the step 1105 has been completed with respect to all the set of items, processing conditions. If not completed (1106, NO), "ELSE" is generated (1108) and the process returns to Step 1105. If there is not (1106, YES), "ELSE printer output" (corresponding to Step 1006 in FIG. 10) is generated (1107) and then it is examined whether there is a registration of the output processing conditions concerning the succeeding client code. If there is (1109, YES), the process returns to Step 1104 and if there is not (1109, NO), the processing is terminated. By the processing described above the output data processing program indicated in FIG. 10 is generated.

When the output data are transmitted from the basic electronic data processing system of the host computer to the work station by an instruction of the user of the work station, the program indicated in FIG. 10 is started. In a sale management system the output data are e.g. bill data obtained by processing sale data, which are input data.

At first the work station is connected with the host computer and output data for every client are transmitted to the work station (1001). When the output data are transmitted (1002, NO), it is judged whether the client code is "00110" or not (1003). If it is, it is examined whether |amount claimed for this month amount claimed for the last month| >2 millions yens or not (1004). If it is, the data are outputted to the mail box (1005). If the judgment at either one of Steps 1003 and 1004 is NO, the transmitted data are outputted to a printer (1006). After the processing at Steps 1005 and 1006 the process returns to Step 1001.

By such a processing it is possible to add output check processings, which are different for different users, to the basic system. The criterion whether the amount claimed in the bill is abnormal or not depends on the scale of the business office and the clients. In the example described above, on the basis of the situation of the trade with the client "00110" it is extraordinary that a variation in the amount claimed per month exceeds 200 millions yens, it is possible to realize a checking processing carefully thought out, reflecting situations, which are peculiar to the user and for which it is necessary to be examined before outputting the bill. Variations of the implementation are identical to those for the input intervening processing.

Next the reservation processing will be explained.

Although the search processing indicated in FIG. 6 was confined to the output of the search result, it is possible also to reserve merchandises, if the search result satisfies the conditions.

Figure 13:
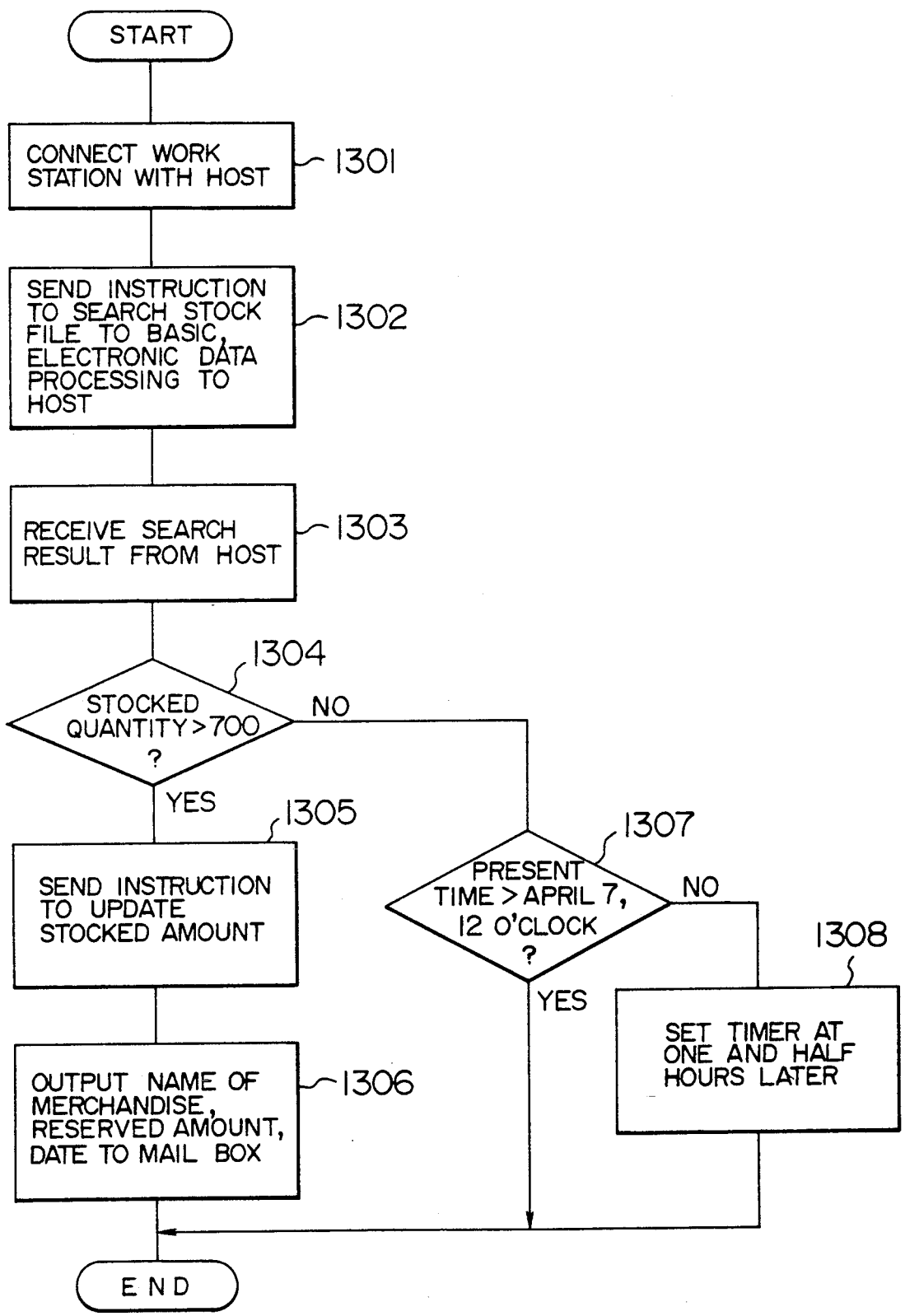
FIG. 13 is a flow chart of the reservation processing program.

FIG. 12 represents an image for registering the reservation data. The user keys-in the reservation data in the underlined parts, as explained previously. By using these data the reservation processing program indicated in FIG. 13 is generated. Just as for the case of the search, it is started at the reservation time. At first a processing of the connection with the host computer is executed (1301). More concretely speaking, "LOGON USER ID/pass word" and "FILE stock" are sent to the host computer. Next an instruction to search the stock file is sent to the basic electronic data processing system in the host computer (1302). Concretely speaking, "FIND the name of merchandise=trousers" is sent. Then an instruction to receive the search result from the host computer (1303). Concretely speaking, "GET the name of merchandise, the stock" is sent. At this time it is examined on the basis of the name of merchandise and the stocked amount sent by the host computer whether the stocked amount exceeds 700 or not (1304), and if it does, an instruction to update the stocked amount ("PUT the name of merchandise, the updated stocked amount") is sent (1305). After that, the name of merchandise, the drawn amount and the date of drawing are outputted to the mail box (1306) and the process is terminated. When the stocked amount is not in accordance with the reservation conditions (1304, NO), if the present time is the time meeting the termination conditions, the process is terminated, as it is, and if it is not, the process is terminated after setting the timer at a time one and half hours later (1308).

In this way it is possible to add the automatic reservation function.

We claim:

1. A computer system comprising:
a host computer for executing a basic electronic data processing; and
work stations connected to said host computer, each of the work stations having:
means for inputting processing conditions associated with input data, said processing conditions defining whether or not said work station should transmit the input data to the host computer based on comparison of the input data with information relating to said processing conditions and specifically preset by the work station;
means for generating a processing program based on the processing conditions inputted through the input means; and
means for controlling transmission of the input data to said host computer by running the processing program when the input data has been inputted thereto.

2. A computer system comprising:
a host computer for executing a basic electronic data processing; and
work stations connected to said host computer, each of the work stations having:
means for inputting processing conditions associated with output data, said processing conditions defining whether or not said work station should output the output data to a printer connected to the work station based on comparison of information relating to said processing conditions and received from said host computer with corresponding data specifically preset by the work station;
means for generating a processing program based on the processing conditions inputted through the input means; and
means for controlling outputting of the output data to the printer by running the processing program when the output data has bene received.

3. A computer system comprising:
a host computer for executing a basic electronic data processing; and
work stations connected to said host computer, each of the work stations having:
means for inputting searching conditions associated with a file located in the host computer site and a search time;
means for generating a processing program based on the searching conditions and the search time;
means for informing the host computer of the searching conditions by running the processing program when the search time has bene reached; and means for receiving a search result from said host computer.

4. A computer system according to claim 3, wherein each of said work stations further includes a mail box and means for storing the search result in said mail box after receiving it from said host computer.

5. A computer system comprising:
- a host computer for executing a basic electronic data processing; and
- work stations connected to said host computer, each of said work stations including:
  - means for inputting processing conditions selected according to data applied thereto;
  - means for generating a processing program based on said inputted processing conditions, said processing program being adapted to check said data with reference to said processing conditions and determine, depending on a result of the check, one of locations preliminarily prepared in said host computer and the work station where said data is to be transmitted, and
  - means for running said processing program when said data is applied thereto, thereby determining the location where said data is to be transmitted.

* * * * *